(12) United States Patent (10) Patent No.: US 12,692,714 B1
Atkinson (45) Date of Patent: Jul. 28, 2026

(54) POLYMER MEMBRANE-LINED POOL PENETRATION ASSEMBLIES, WALL STRUCTURES AND RELATED METHODS

(71) Applicant: Com Pac Filtration, Inc., Jacksonville, FL (US)

(72) Inventor: Dean M. Atkinson, Jacksonville, FL (US)

(73) Assignee: Com Pac Filtration, Inc., Jacksonville, FL (US)

( * ) Notice: Subject to any disclaimer, the term of this patent is extended or adjusted under 35 U.S.C. 154(b) by 487 days.

(21) Appl. No.: 18/053,978

(22) Filed: Nov. 9, 2022

Related U.S. Application Data

(60) Provisional application No. 63/277,636, filed on Nov. 10, 2021.

(51) Int. Cl.
*E04H 4/00* (2006.01)
*E04H 4/14* (2006.01)
*F16B 45/00* (2006.01)

(52) U.S. Cl.
CPC .......... *E04H 4/0081* (2013.01); *E04H 4/142* (2013.01); *E04H 2004/147* (2013.01); *F16B 45/002* (2021.05)

(58) Field of Classification Search
CPC .............. E04H 4/142; E04H 2004/146; E04H 12/2215; E04H 12/2223; E02D 5/80; E02D 5/801; E02D 5/803; E04D 5/145; E04B 1/4157; F16B 45/002; F16B 45/008; F16B 13/0875; E21D 21/0086
See application file for complete search history.

(56) References Cited

U.S. PATENT DOCUMENTS

| | | | | | |
|---|---|---|---|---|---|
| 2,706,967 | A | * | 4/1955 | Iannetti | A01K 1/04 |
| | | | | | 403/143 |
| 3,868,732 | A | * | 3/1975 | Engelhart | E04H 4/143 |
| | | | | | 403/197 |
| 5,408,706 | A | * | 4/1995 | Barnes | E03F 5/0407 |
| | | | | | 210/163 |
| 9,410,337 | B1 | * | 8/2016 | Wall | E04H 4/12 |
| 11,530,518 | B1 | * | 12/2022 | Lloyd | E02B 3/123 |
| D974,151 | S | * | 1/2023 | Chen | D8/354 |
| 12,291,833 | B1 | * | 5/2025 | Yeom | E02D 5/803 |
| 2004/0093666 | A1 | * | 5/2004 | Zars | E04H 4/1236 |
| | | | | | 4/507 |
| 2008/0008555 | A1 | * | 1/2008 | Ardern | E04H 12/2223 |
| | | | | | 411/411 |
| 2011/0265296 | A1 | * | 11/2011 | Perkins | E04G 21/328 |
| | | | | | 24/595.1 |

(Continued)

*Primary Examiner* — Kyle J. Walraed-Sullivan
(74) *Attorney, Agent, or Firm* — ALLEN, DYER, DOPPELT + GILCHRIST, P.A.

(57) ABSTRACT

A penetration assembly for a polymer membrane-lined pool includes a faceplate having a weldment surface surrounding a penetration area, and a retention perimeter extending away from the weldment surface. The faceplate is formed of a polymer material allowing the polymer membrane to be heat welded directly to the weldment surface on grade with the membrane, forming a watertight seal around the penetration area. The retention perimeter is embedded below grade to keep the penetration assembly in place. A wall assembly is formed from a plurality of polymer wall panels, to bottom portions of which the periphery of the polymer membrane is continuously welded.

16 Claims, 7 Drawing Sheets

(56) References Cited

U.S. PATENT DOCUMENTS

| 2012/0227678 | A1* | 9/2012 | Milani | A01K 1/04 |
| | | | | 119/712 |
| 2022/0333635 | A1* | 10/2022 | Colyn | B25C 7/00 |
| 2024/0125071 | A1* | 4/2024 | Masghouni | E02D 5/54 |

\* cited by examiner

POLYMER MEMBRANE-LINED POOL PENETRATION ASSEMBLIES, WALL STRUCTURES AND RELATED METHODS

CROSS-REFERENCE TO RELATED APPLICATION

This application claims the benefit of U.S. Provisional Patent Application Ser. No. 63/277,636, filed on Nov. 10, 2021, the contents of which are herein incorporated by reference in their entirety.

FIELD OF THE INVENTION

The present invention relates to swimming pools line with polymer membranes, and more particularly, to the construction of such pools and assemblies used in connection therewith.

BACKGROUND OF THE INVENTION

The use of a flexible polymer membrane as a swimming pool liner has been a common industry practice for decades, and has also been used on a much larger scale to line holding basins for waste water from mining and other industrial processes. While the performance of these polymer membrane liners has been generally high, problems sometimes arise in areas where the liner must be joined to other pool components. For example, membrane-lined in ground pools will sometimes feature concrete walls to which the liner must be connected. Generally, this requires plastic pieces that are heat weldable with the liner to be embedded in the concrete. Similar problems arise with suction and discharge connections and other fittings that must penetrate the liner. Additionally, liner appearance and/or performance are sometimes reduced where the liner must traverse tight or other awkward underlying geometry, such as when the liner extends from the bottom of the pool up the sidewalls.

SUMMARY OF THE INVENTION

In view of the foregoing, it is an object of the present invention provide an improved polymer membrane-lined pool penetration assemblies, wall structures and related components and methods. According to an embodiment of the present invention, a penetration assembly for a polymer membrane-lined pool includes a faceplate having a weldment surface surrounding a penetration area, and a retention perimeter extending away from the weldment surface. The faceplate is formed of a polymer material compatible for heat welding with the polymer membrane liner. The faceplate can be formed as a single unitary piece with the retention perimeter and a recess extending away from the weldment surface.

According to an aspect of the present invention, the penetration assembly further includes at least one of an eyebolt attached in the recess, a dosing nozzle secured in the recess, an ultrasonic transducer secured in the recess, and a water line connection formed. A grate can cover the recess. An earth anchor can connected to the recess extending away therefrom.

In a polymer membrane-lined pool, the weldment surface is located on a grade of the polymer membrane at a location of the at least one penetration. The at least one penetration is located over the penetration area and a portion of the polymer membrane surrounding the penetration is plastic welded to the weldment surface forming a complete watertight seal thereabout. The retention perimeter is embedded below the grade in the underlying surface.

According to a further embodiment of the present invention, a wall assembly is formed from a plurality of polymer wall panels, to bottom portions of which the periphery of the polymer membrane is continuously welded.

These and other objects, aspects and advantages of the present invention will be better appreciated in view of the drawings and following detailed description of preferred embodiments.

DETAILED DESCRIPTION OF PREFERRED EMBODIMENTS

Figures 1, 2:
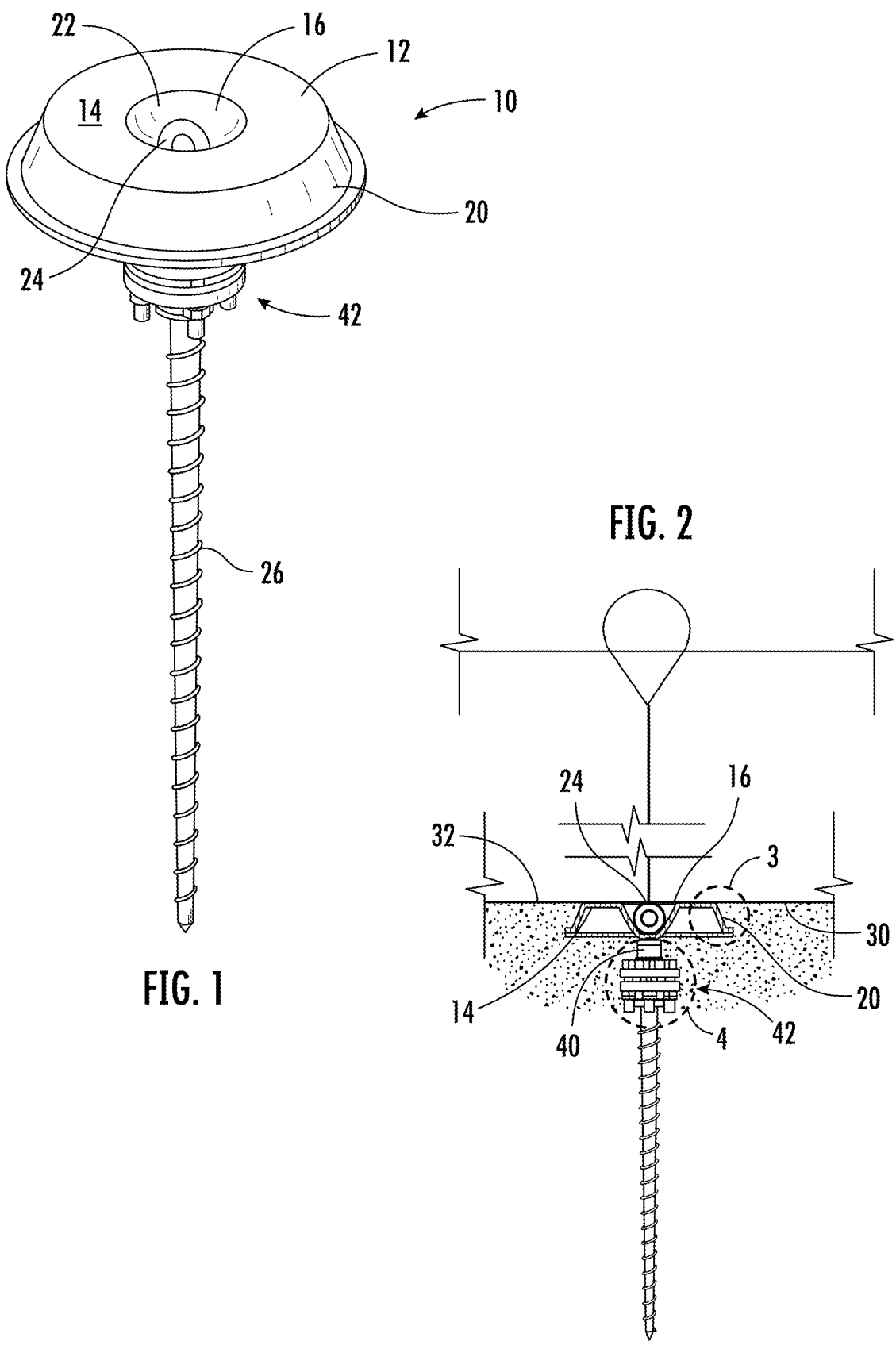
FIG. 1 is a perspective view of an anchor point penetration assembly, according to an embodiment of the present invention.
FIG. 2 is a partially-sectioned side-view of the anchor point penetration assembly of FIG. 1 schematically depicted in an environment of use.

According to an embodiment of the present invention, referring to FIGS. 1 and 2, a penetration assembly 10 includes a faceplate 12 having a weldment surface 14 surrounding a penetration area 16. A retention perimeter 20 extends away from the weldment surface 14. In the depicted embodiment, the penetration area 16 includes a recess 22 with an eyebolt 24 attached therein, allowing the penetration assembly 10 to be utilized as a buoy anchor. For pool applications where the penetration assembly 10 is not embedded in concrete, the assembly 10 further includes an earth anchor 26 connected thereto.

In use, the faceplate 12 is placed so that the weldment surface 14 is located on the grade 30 on which the polymer membrane liner 32 lies. The liner 32 is plastic welded to the weldment surface 14 around the penetration area 16, creating a complete watertight seal thereabout. The liner 32 is cut over the penetration area 16, either before or after welding, allowing access thereto through the liner 32. To allow plastic welding and simplify fabrication of the penetration assembly 10, the entire faceplate 12 is formed of a polymer material weldable with the polymer membrane liner 32. For liners 32 formed from linear low density polyethylene (LLDPE) a faceplate 12 formed of rigid high density polyethylene (HDPE) is preferred.

Figure 3:
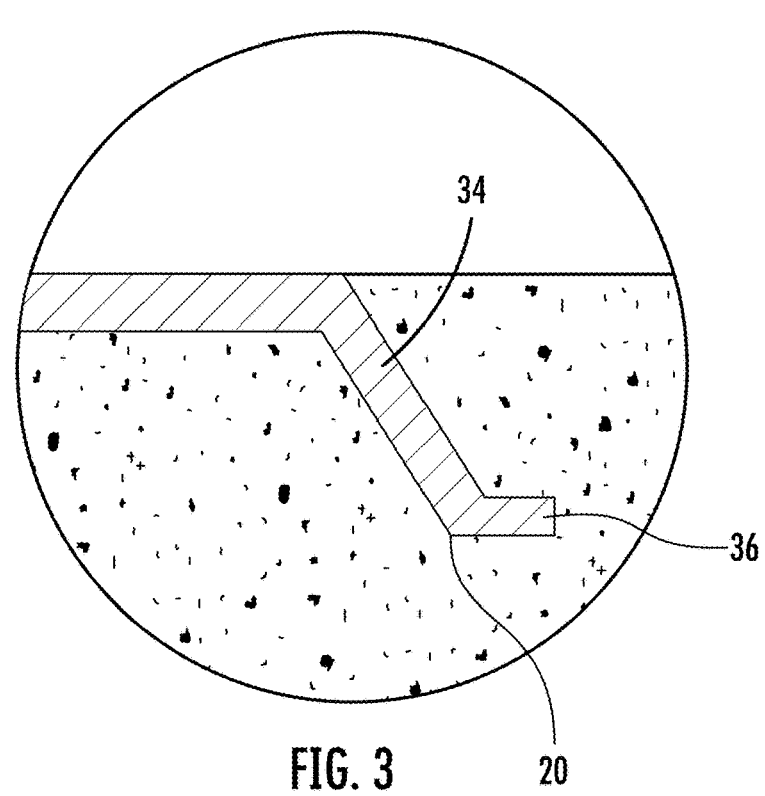
FIG. 3 is a detail view of area 3 of FIG. 2.

The retention perimeter 20 is embedded below the grade 30, helping to retain the penetration assembly 10 in place and prevent separation resulting from relative motion between the liner 32 and the penetration assembly (e.g., due to expansion and contraction of the liner 32). Referring to FIG. 3, the retention perimeter 20 includes an outwardly sloping section 34 and a peripheral lip 36. The outwardly sloping section 34 extends away from the weldment surface 14 at an angle and the lip 36 extends away from a distal periphery of the sloping section 34 approximately parallel to the weldment surface 14. The lip 36 improves the anchoring strength of the retention perimeter 20 and also acts as a water stop.

Figure 4:
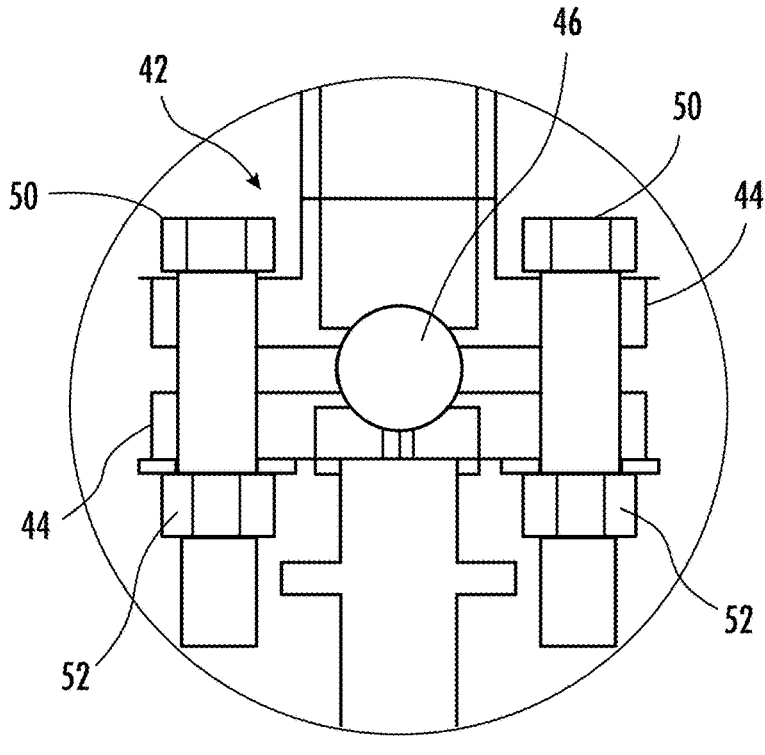
FIG. 4 is a detail view of area 4 of FIG. 2.

Referring again to FIGS. 1 and 2, the eyebolt 24 is secured in the penetration area 16 by a nut 40 attached on an opposite side of the faceplate 12. Advantageously, the earth anchor 26 connects to the eyebolt 24 via an adjustable ball joint 42. Referring to FIG. 4, the ball joint 42 includes a pair of pressure plates 44 connected on opposite sides of a ball 46. The angle between pressure plates 44 is adjustable, allowing the faceplate 12 to be pivoted so the weldment surface 14 can match a sloping grade. Bolts 50, extending through the pressure plates 44, and nuts 52 keep the pressure plates 44 solidly in engagement with the ball 46. Where the grade 30 is formed of concrete in which the faceplate 12 is embedded, the earth anchor 26 and ball joint 42 can be omitted.

It will be appreciated that design features of the buoy anchor penetration assembly 10 can be readily applied to penetration assemblies configured for other purposes while remaining within the scope of the present invention. In the following description (and depiction in the Figures) of alternative embodiments, like components are given like reference numbers (e.g., faceplate 12, 12A, 12B, etc.) and, except as described, have substantially similar structure and function.

Figures 5, 6:
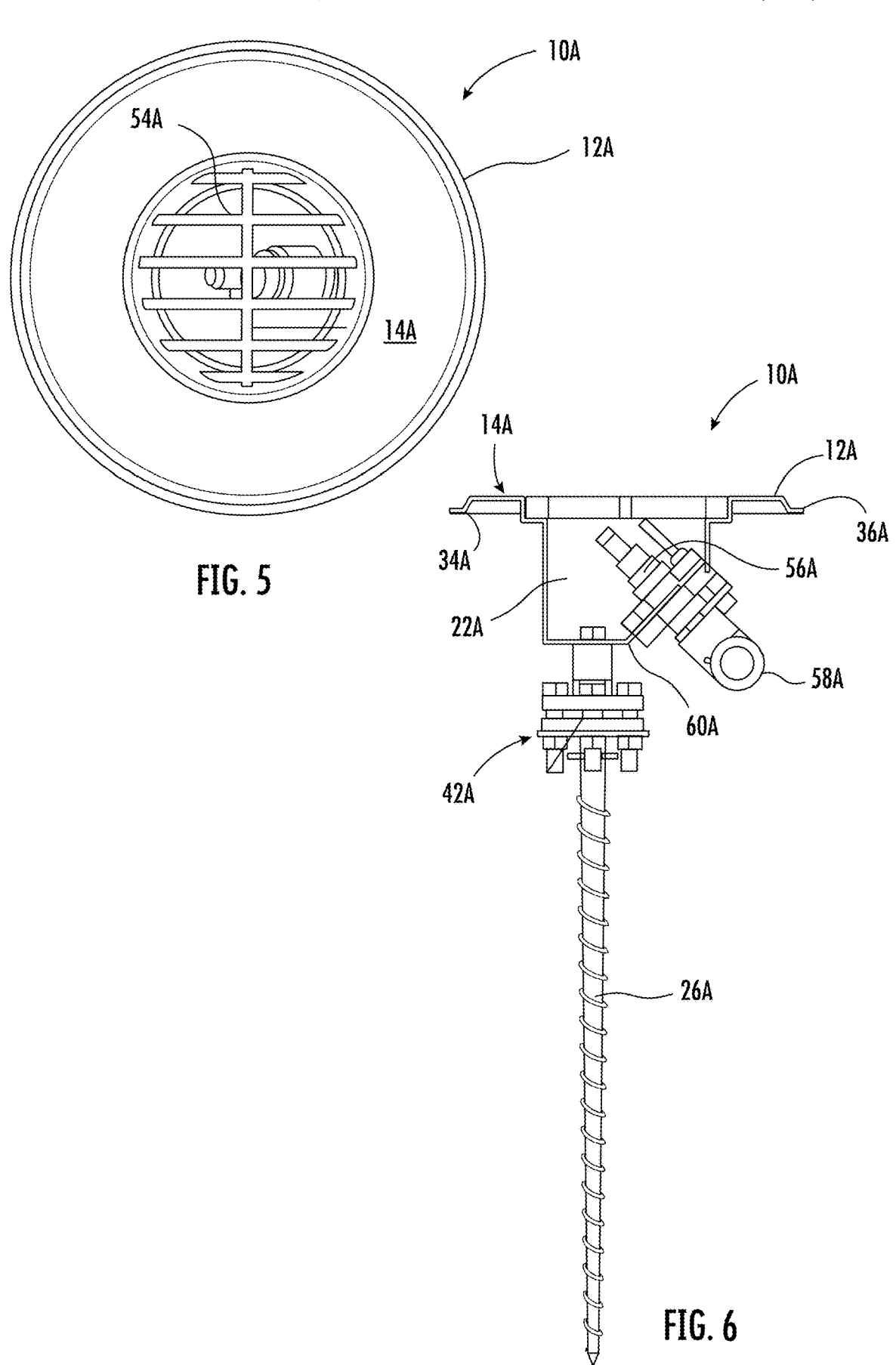
FIG. 5 is an end view of dosing nozzle penetration assembly, according to another embodiment of the present invention.
FIG. 6 is a partially-sectioned side view of the dosing nozzle penetration assembly of FIG. 5.

Referring to FIGS. 5 and 6, according to another embodiment of the present invention, a penetration assembly 10A includes a faceplate 12A having a weldment surface 14A surrounding a penetration area 16A. In the depicted embodiment, the penetration area 16A includes a recess 22A covered with a grate 54A in which a dosing nozzle 56A is secured. For pool applications where the penetration assembly 10A is not embedded in concrete, the assembly 10A further includes an earth anchor 26A.

The placement of the faceplate 12A and connection to a polymer membrane liner to the weldment surface 14A around the penetration area 16A is substantially as described above in connection with the penetration assembly 10. As with the retention perimeter 20, the retention perimeter 20A extends away from the weldment surface 14A and includes a sloping section 34A and peripheral lip 36A.

The recess 22A of the penetration area includes an angled sidewall 60A, through which the dosing nozzle 56A is connected and directed at an angle towards the grate 54A. A dosing line connection 58A of the dosing nozzle 56A is located outside the recess 22A.

When used, the earth anchor 26A is connected to a bottom wall 62A of the recess 22A via a bolt 64A. A ball joint 42A is advantageously also used to connected between the earth anchor 26A.

Figure 7:
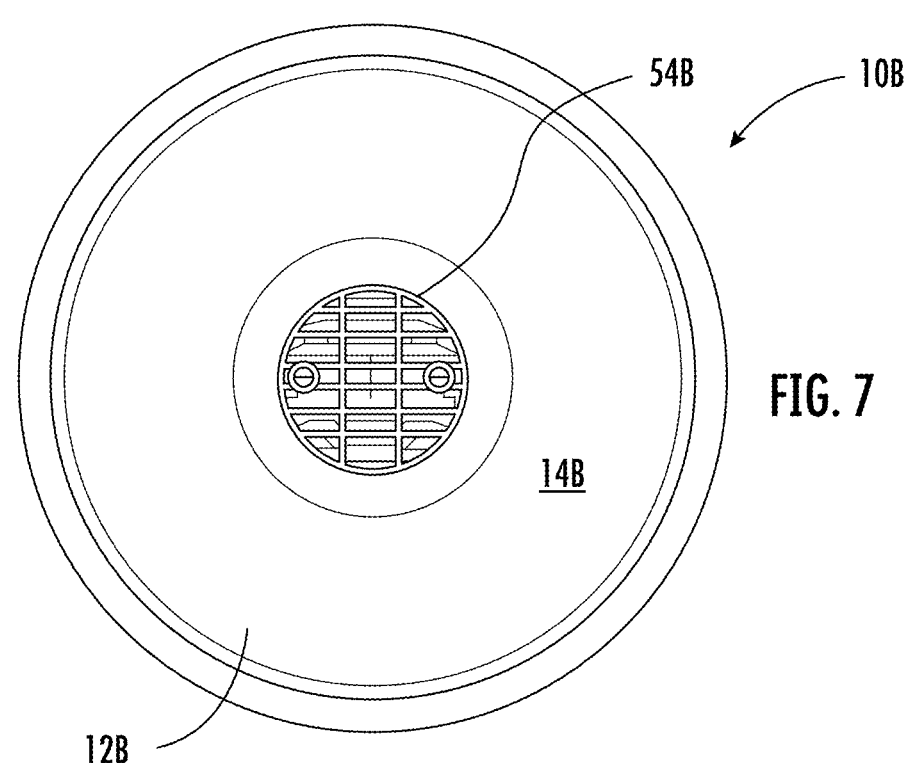
FIG. 7 is an end view of another dosing nozzle penetration assembly, according to a further embodiment of the present invention.
Figure 8:
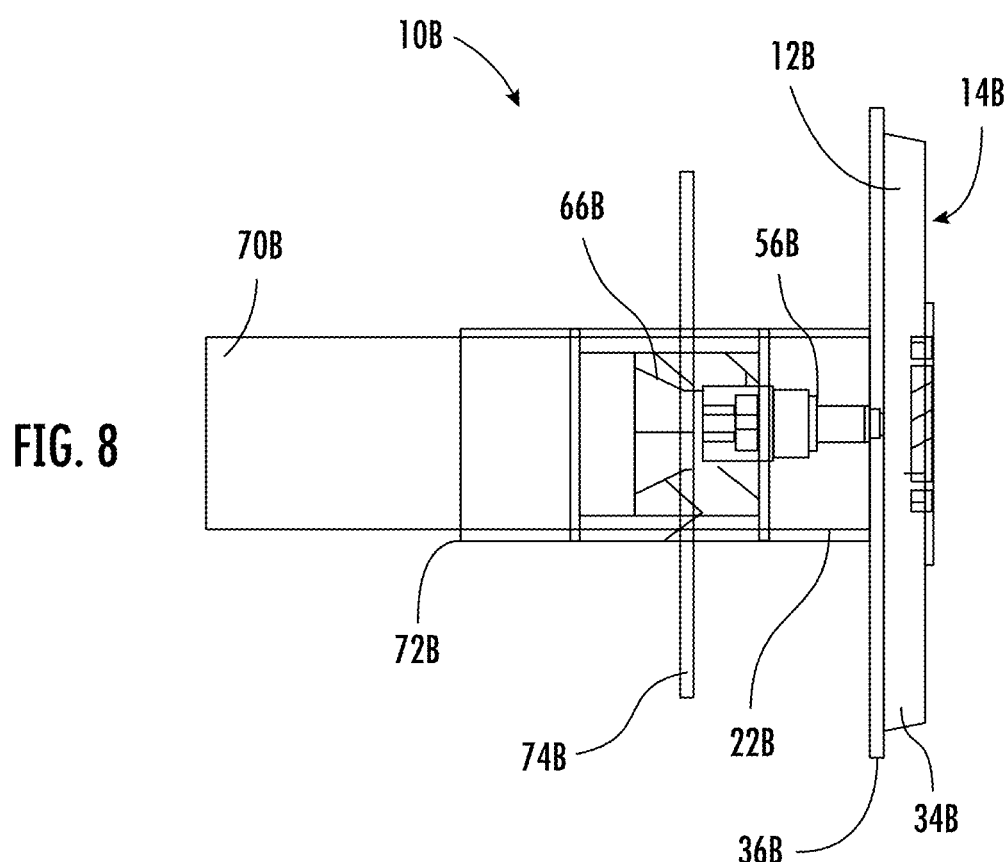
FIG. 8 is a partially-sectioned side view of the dosing nozzle penetration assembly of FIG. 7.

While the penetration assemblies 10, 10A are configured for mounting at the bottom of a pool, it will be appreciated that their design features can readily be applied to penetration assemblies configured for mounting in walls of a polymer membrane-lined pool. Referring to FIGS. 7 and 8, a penetration assembly 10B includes a faceplate 12B having a weldment surface 14B surrounding a penetration area 16B. The penetration area 16B of the assembly 10B includes a recess 22B covered with a grate 54B in which a dosing nozzle 56B is secured.

Unlike in the penetration assembly 10A, the dosing nozzle 56B is secured within the recess 22B by an adapter 66B pointing directly at the grate 54B. A dosing line 70B is coupled directly to an open end 72B of the recess 22B opposite the grate 54B.

In use, the penetration assembly 10B is embedded within a concrete wall of the pool with the weldment surface 14B flush with the wall for connection with the polymer membrane liner covering the wall. The retention perimeter 20B with the sloping section 34B and peripheral lip 36B help secure the assembly 10B within the wall and prevent relative motion with the liner, as well as serving as a water stop. If desired, an additional water stop 74B can extend from around the recess 22B behind the faceplate 12B.

Figure 9:
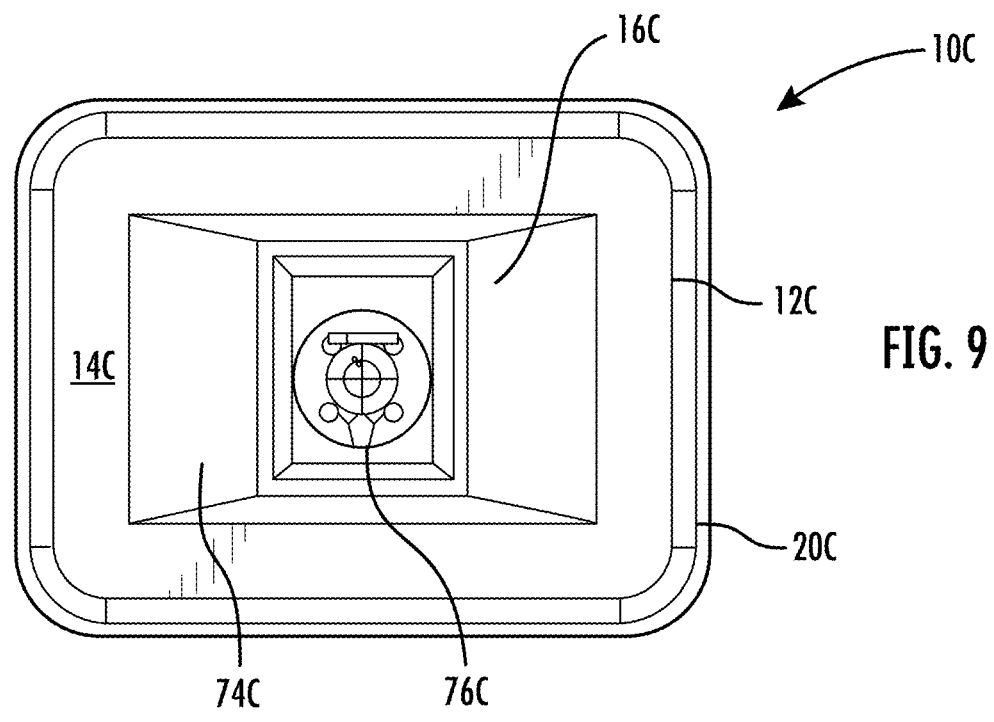
FIG. 9 is an end view of an ultrasonic transducer penetration assembly, according to an additional embodiment of the present invention.
Figure 10:
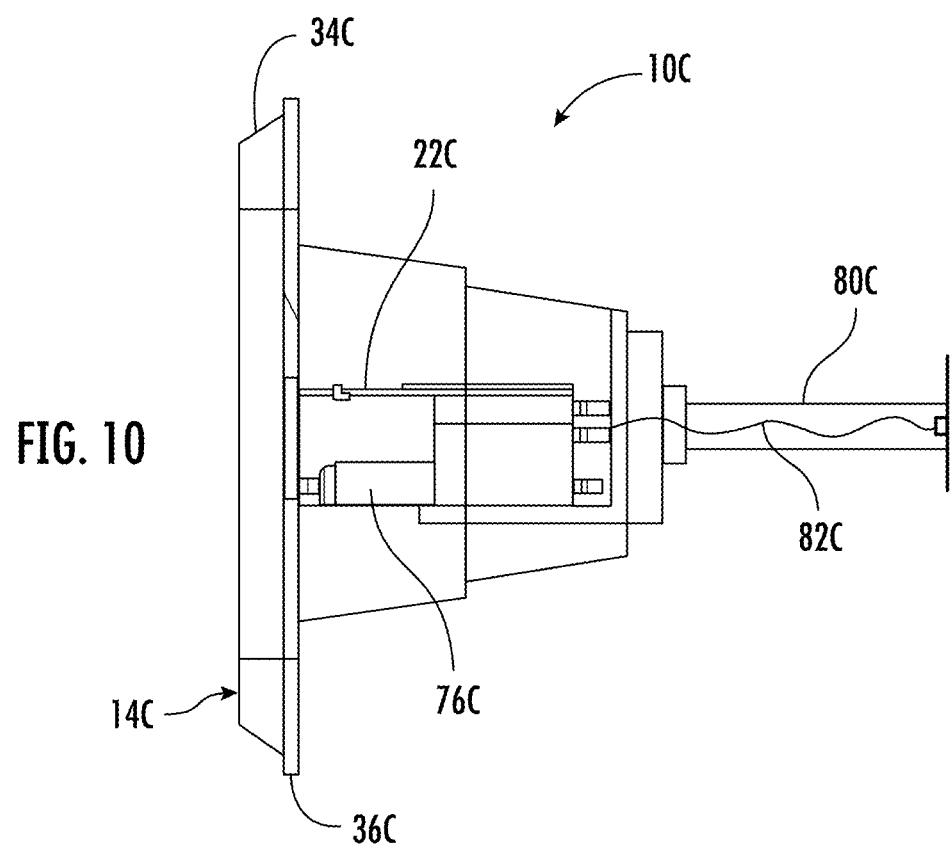
FIG. 10 is a partially-sectioned side view of the ultrasonic penetration assembly of FIG. 9.
Figure 11:
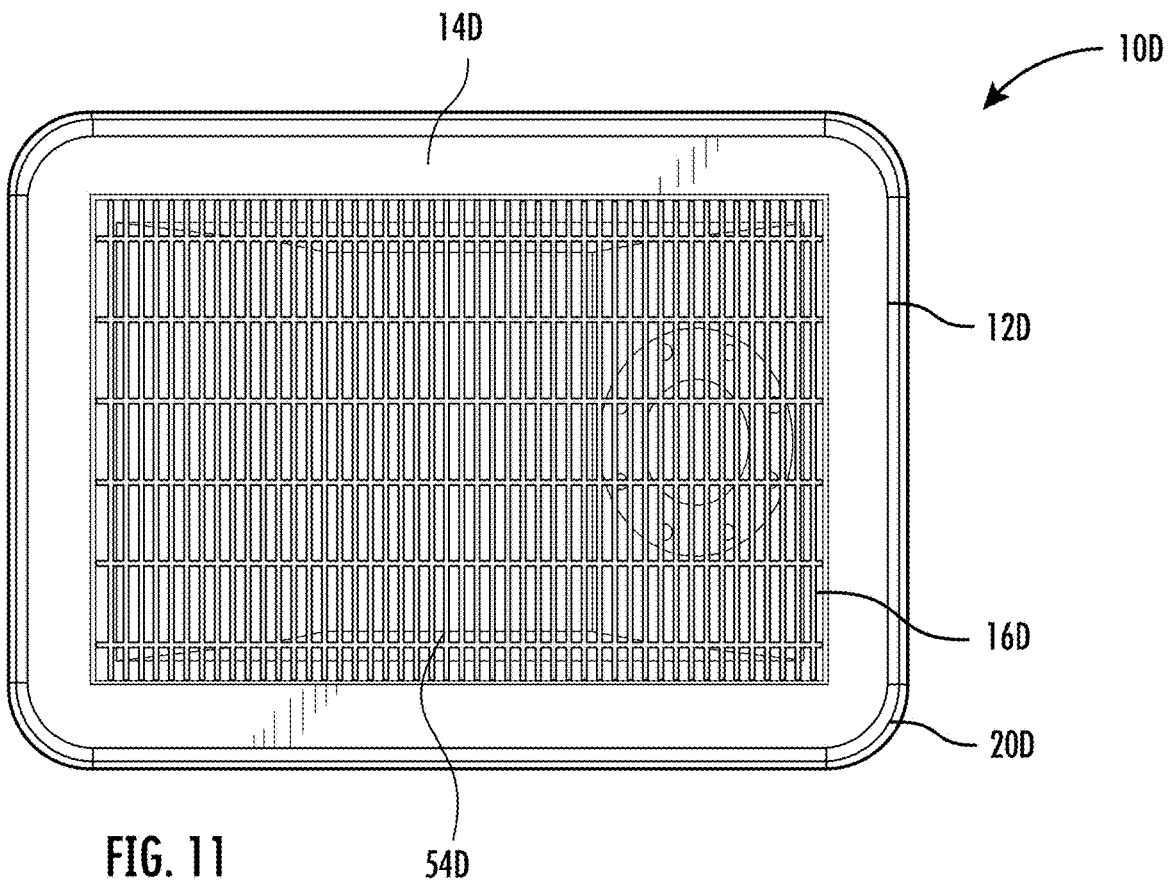
FIG. 11 is an end view of a water connection penetration assembly, according to another embodiment of the present invention.
Figure 12:
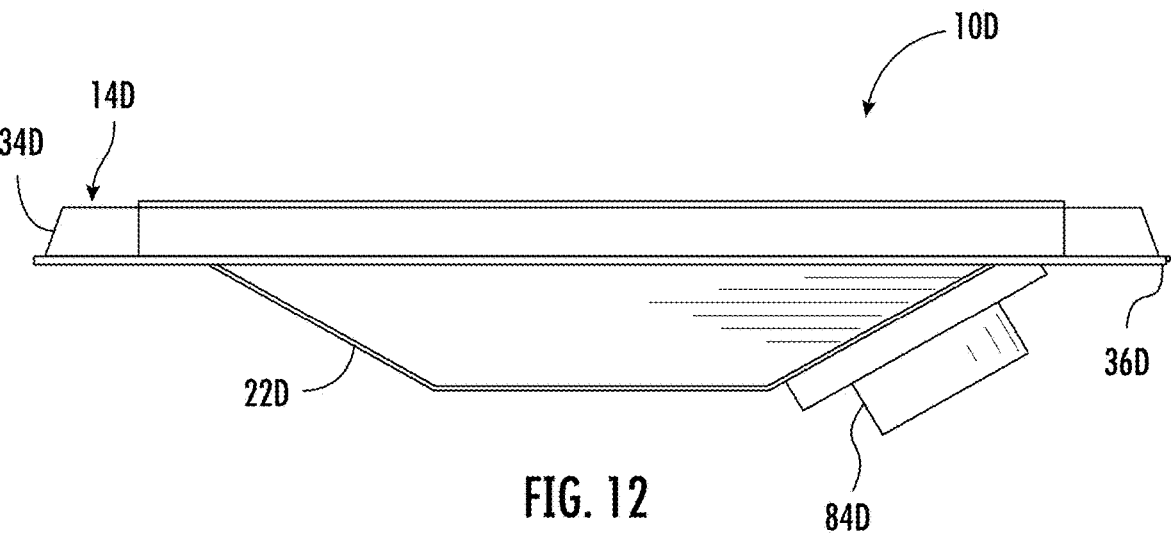
FIG. 12 is a side view of the water connection penetration assembly of FIG. 11.

It will also be appreciated that the size and shape of the penetration assembly can readily adjusted depending on the nature of the required liner penetration, while still retaining the different features and advantages of the present invention. Referring to FIGS. 9 and 10, a penetration assembly 10C includes a generally rectangular faceplate 12C having a weldment surface 14C surrounding penetration area 16C. The penetration area 16C includes a recess 22C in which sloped sidewalls 74C lead to an ultrasonic transducer 76C.

Though different in overall shape, the faceplate 12C is still configured to be embedded in a concrete wall or other surface underlying the polymer membrane liner so that the liner can be welded to the weldment surface 14C flush with the underlying surface. Additionally, the functions of the retention perimeter 20C, with sloping section 34C and peripheral lip 36C, is fully retained. In the depicted embodiment, the rear of the recess 22C is added for connection to conduit 80C through which wiring 82C for the transducer 76C runs.

In another embodiment, a penetration assembly 10D includes a substantially rectangular faceplate 12D again having a weldment surface 14D surrounding a penetration area 16D. The penetration area 16D includes a recess 22D covered with a grate 54D in which a water line connection 84D is formed, allowing the penetration assembly 10D to be connected to a circulation system of the pool or other piping for introducing water to or removing it from the pool.

The faceplate 12D is again configured to be embedded in a concrete wall or other surface underlying the polymer membrane liner so that the liner can be welded to the weldment surface 14D flush with the underlying surface. Also, the retention perimeter 20D, with sloping section 34D and peripheral lip 36D, again functions to prevent relative motion between the liner and penetration assembly 10D and serves as a water stop.

Figure 13:
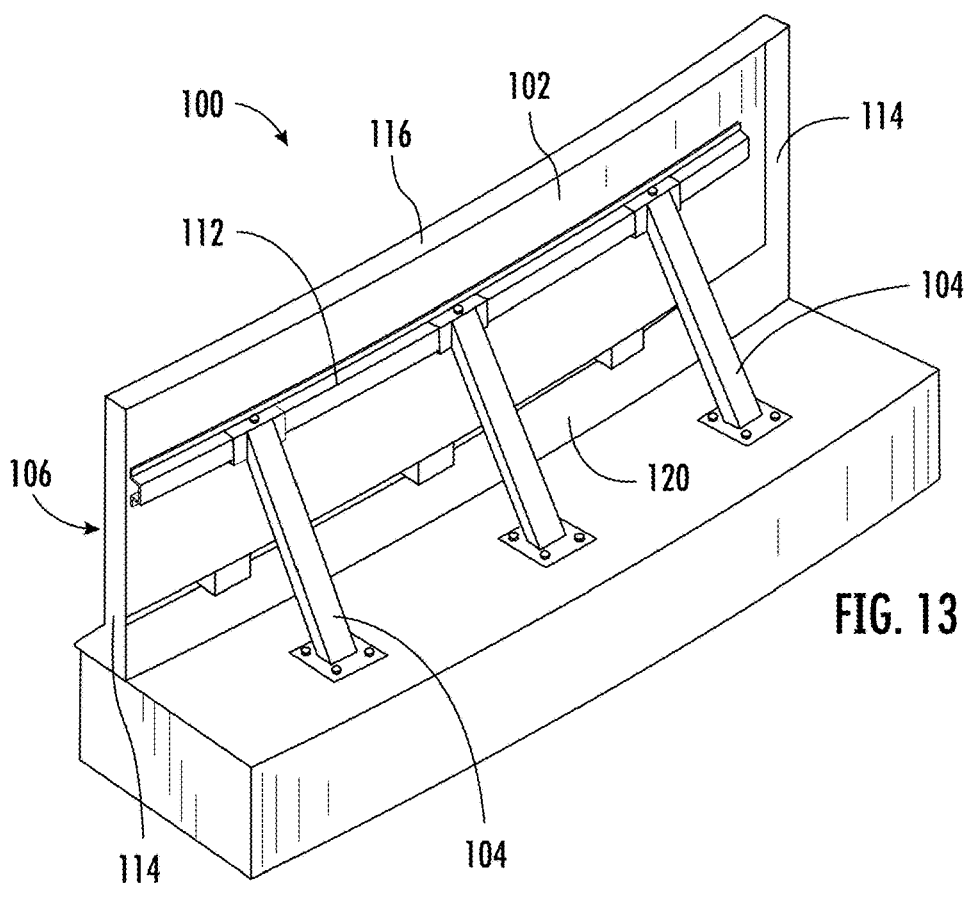
FIG. 13 is a perspective view of a wall assembly, according to a further embodiment of the present invention.
Figure 14:
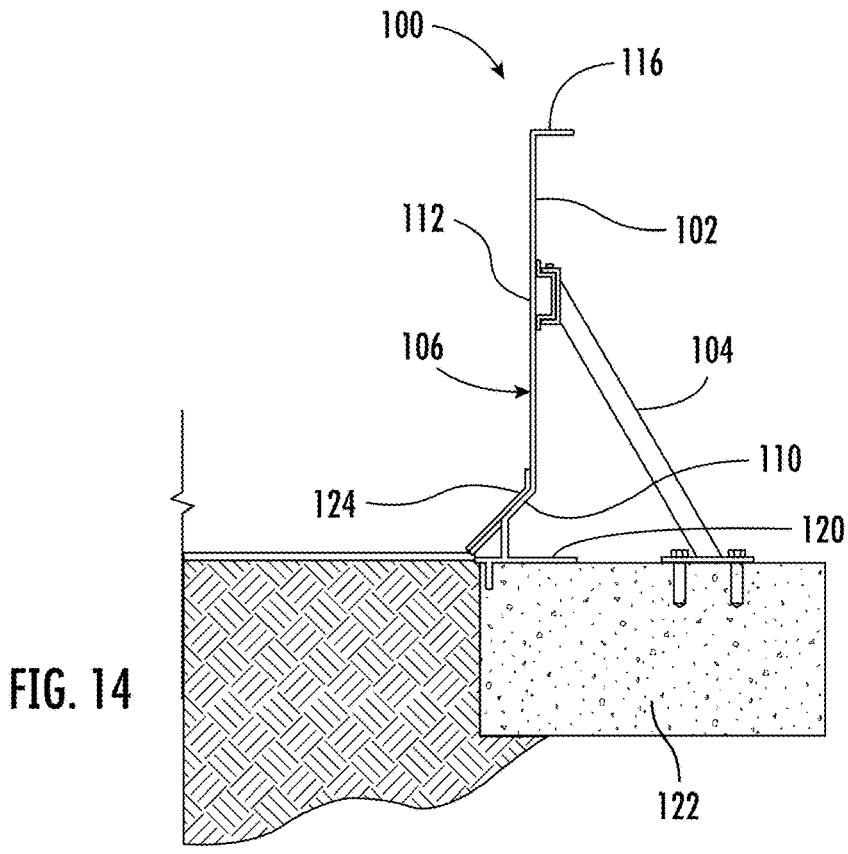
FIG. 14 partially-sectioned side-view of the wall assembly of FIG. 13 schematically depicted in an environment of use.

Particularly as it relates to the wall of a polymer membrane-lined swimming pool, another way to simplify the formation of watertight penetrations is to avoid the need to line the wall with a membrane altogether. Referring to FIGS. 13 and 14, according to a further aspect of the present invention, a wall assembly 100 includes one or more wall panels 102 reinforced by exterior supports 104. The wall panel 102 is formed from a polymer material compatible for heat welding with the polymer membrane liner of the pool. For example, an HDPE wall panel is advantageous for use with a LLDPE liner. The exterior supports 104 are preferably steel or other sufficiently rigid and strong material.

Each panel 102 has an inner face 106, which is shaped based on a desired profile of the pool wall where the panel 102 will be located, such as the concavely-curved face 106 in the depicted embodiment. Advantageously, a bottom portion 110 of the inner face 106 is outwardly angled. A channel 112 is formed on the obverse of the inner face 106, which serves as an attachment point for the exterior supports 104. The channel 112 can be molded together with the rest of the panel 102 or welded or otherwise attached after the formation of the panel 102.

For additional rigidity and ease of placement and assembly, integrally-formed sidewalls 114 and top and bottom walls 116, 120 extend rearwardly from the inner face 106 and reinforcement sections 122 extend between the angled bottom portion 110 and the bottom wall 120.

In use, a concrete footer 122 is poured around a perimeter of a desired pool location. A plurality of panels 102 are placed on the footer on their bottom walls to collectively form an outer wall of the pool. The sidewalls 114 of adjacent panels 102 are bolted or otherwise fastened together. Adhesives, sealants and/or heat welding can also be utilized between adjacent panels 102 to form a watertight seal. The exterior supports 104 are connected between the channels 112 of the panels 102 and the footer 122. A liner 124 covering the bottom of the pool is continuously welded to the angled bottom portions 110 of the panels 102. The area behind the panels 102 is filled with earth or other suitable material and the pool is filled.

Any necessary penetrations in the bottom of the pool are preferably formed through the liner in the manner described above in connection with the different embodiments of penetration assemblies according to the present invention. Wall penetrations can be formed integrally with the panels 102 or heat welded directly thereto.

The above-described embodiments are provided for illustrative purposes; the present invention is not necessarily limited thereto. Rather, those skilled in the art will appreciate that various modifications, as well as adaptations to particular circumstances, will fall within the scope of the invention herein shown and described and of the claims appended hereto.

What is claimed is:

1. A penetration assembly for a polymer membrane-lined pool, the penetration assembly comprising:
   a faceplate having a thermoplastic weldment surface integrally formed with the faceplate and compositionally compatible for heat welding to a polymer membrane liner, the weldment surface being heat welded to the polymer membrane liner to define a continuous plastic weld bead circumscribing a penetration area having a recess extending away from the weldment surface;
   an earth anchor connected to the recess and extending away therefrom; and
   a retention perimeter extending away from the weldment surface;
   wherein the faceplate is formed of a polymer material; and
   wherein the earth anchor is connected to the recess via a sealed ball joint seated in an integrally molded spherical seat of the recess, the ball joint being enclosed within the recess volume to maintain watertightness.

2. The penetration assembly of claim 1, further comprising at least one of:
   an eyebolt attached in the recess;
   a dosing nozzle secured in the recess;
   an ultrasonic transducer secured in the recess; and
   a water line connection formed.

3. The penetration assembly of claim 2, further comprising a grate covering the recess.

4. The penetration assembly of claim 2, further comprising the dosing nozzle secured in the recess.

5. The penetration assembly of claim 4, wherein the recess includes an angled sidewall through which the dosing nozzle is connected and directed at an angle towards a grate covering the recess.

6. The penetration assembly of claim 4, further comprising an adapter located within the recess, the adapter securing the dosing nozzle directed directly at a grate covering the recess.

7. The penetration assembly of claim 1, wherein the retention perimeter includes an outwardly sloping section at an acute angle relative to the weldment surface extending away from the weldment surface and a peripheral lip extending away from a distal periphery of the sloping section approximately parallel to the weldment surface.

8. The penetration assembly of claim 7, wherein the penetration area includes a recess extending away from the weldment surface and the penetration assembly further comprises a polymer water stop integrally molded with and extending from a backside of the faceplate, the water stop projecting rearward from the recess so as to interrupt fluid flow paths behind the faceplate.

9. The penetration assembly of claim 1, wherein the penetration area includes a recess extending away from the weldment surface, the recess being formed as a unitary polymer piece with the faceplate.

10. The penetration assembly of claim 9, wherein the retention perimeter is formed as a unitary polymer piece with the faceplate and the recess.

11. The penetration assembly of claim 9, wherein the polymer material comprises a thermoplastic compatible with heat welding to the polymer membrane liner.

12. A polymer membrane-lined pool comprising:
   a polymer membrane lying on an underlying surface and having at least one penetration therethrough; and
   a penetration assembly having a polymer faceplate with a thermoplastic weldment surface integrally formed with the faceplate and compositionally compatible for heat welding to the polymer membrane liner, the weldment surface being heat welded to the polymer membrane liner to define a continuous plastic weld bead completely encircling a penetration area and a retention perimeter extending away from the weldment surface, the weldment surface being located on a grade of the polymer membrane at a location of the at least one penetration, the at least one penetration being located over the penetration area and a portion of the polymer membrane surrounding the penetration being thermoplastically welded to the weldment surface forming a complete watertight seal thereabout, the retention perimeter being embedded below the grade in the underlying surface;
   wherein the underlying surface is earth and the penetration assembly includes an earth anchor connected to the faceplate by a sealed ball joint seated in an integrally molded spherical seat of the recess, the ball joint being enclosed within the recess volume to maintain watertightness.

13. The polymer membrane-lined pool of claim 12, wherein the underlying surface is concrete and the retention perimeter is embedded in the concrete.

14. The polymer membrane-lined pool of claim 12, wherein the earth anchor is connected to the faceplate by the sealed ball joint, the sealed ball joint being enclosed within the recess and configured to allow angular adjustment of the earth anchor without compromising the watertight weldment interface.

15. The polymer membrane-lined pool of claim 12, wherein the penetration area includes a recess extending away from the weldment surface and the penetration assembly further includes at least one of:

an eyebolt attached in the recess;

a dosing nozzle secured in the recess;

an ultrasonic transducer secured in the recess; and a water line connection formed.

16. A penetration assembly for a polymer membrane-lined pool, the penetration assembly comprising:

a faceplate having a thermoplastic weldment surface integrally formed with the faceplate and compositionally compatible for heat welding to a polymer membrane liner, the weldment surface being heat welded to the polymer membrane liner to define a continuous plastic weld bead circumscribing a penetration area; and a retention perimeter extending away from the weldment surface;

wherein the faceplate is formed of a polymer material; and wherein the retention perimeter includes an outwardly sloping section at an acute angle relative to the weldment surface extending away from the weldment surface and a peripheral lip extending away from a distal periphery of the sloping section approximately parallel to the weldment surface.

*     *     *     *     *